United States Patent
Chang

(10) Patent No.: US 6,779,853 B1
(45) Date of Patent: Aug. 24, 2004

(54) SPOKE FASTENER FOR MOUNTING A SPOKE ON A WHEEL RIM

(75) Inventor: Owen Chang, Taichung Hsien (TW)

(73) Assignee: Giant Manufacturing Co. Ltd., Taichung Hsien (TW)

( * ) Notice: Subject to any disclaimer, the term of this patent is extended or adjusted under 35 U.S.C. 154(b) by 0 days.

(21) Appl. No.: 10/429,850

(22) Filed: May 6, 2003

(51) Int. Cl.[7] .................................................. B60B 1/14
(52) U.S. Cl. ...................... 301/58; 301/95.106; 301/104
(58) Field of Search ..................... 301/55, 58, 95.104, 301/95.106, 79

(56) References Cited

U.S. PATENT DOCUMENTS

| | | | | |
|---|---|---|---|---|
| 291,457 A | * | 1/1884 | Woodward | 301/58 |
| 1,223,140 A | * | 4/1917 | Boudreaux | 152/94 |
| 1,850,436 A | * | 3/1932 | White, Jr. | 301/67 |
| 2,049,215 A | * | 7/1936 | Main et al. | 301/6.7 |

* cited by examiner

*Primary Examiner*—Russell D. Stormer
(74) *Attorney, Agent, or Firm*—Harness, Dickey & Pierce, P.L.C.

(57) ABSTRACT

A spoke fastener includes a shank extending along a shank axis and having an anchoring portion and an operating portion. The anchoring portion is formed with resilient arm segments that are angularly spaced apart from each other relative to the shank axis. Each of the resilient arm segments has a distal end formed with a radial outward anchor projection to form the anchoring portion with an initial cross-section. The anchor projections are forcible radially and inwardly toward the shank axis to form the anchoring portion with a restricted cross-section, there by permitting extension of the anchoring portion through a spoke fastening hole in a wheel rim and retention of the anchoring portion on the wheel rim. A through hole extends through the operating and anchoring portions, permits extension of a spoke into the shank, and has a threaded segment for threaded engagement with the spoke.

4 Claims, 5 Drawing Sheets

US 6,779,853 B1

SPOKE FASTENER FOR MOUNTING A SPOKE ON A WHEEL RIM

BACKGROUND OF THE INVENTION

1. Field of the Invention

The invention relates to a bicycle wheel, more particularly to a spoke fastener for mounting an externally threaded end of a spoke to a wheel rim.

2. Description of the Related Art

In a bicycle, a wheel rim is usually connected to a hub by a set of spokes.

As shown in FIG. 1, a spoke 1 has a threaded end 101 connected to a wheel rim 2 using a conventional spoke fastener 3 that includes a spoke connecting member 301 and a rim connecting member 302. The spoke connecting member 301 is in the form of an internally threaded socket for engaging the threaded end 101. The rim connecting member 302 is in the form a headed bolt that connects the spoke connecting member 301 to the wheel rim 2. The conventional spoke fastener 3 is disadvantageous in that it involves more than one component and is relatively troublesome to install.

FIG. 2 shows another conventional connection between a spoke 4 and a wheel rim 5. The wheel rim 5 is formed with a set of spoke connecting blocks 501. The spoke 4 extends through a respective one of the spoke connecting blocks 501, and has a head end 401 stopped by the respective spoke connecting block 501. However, since the wheel rim 5 is typically formed by extrusion, additional finishing operations are required to form the spoke connecting blocks 501, which results in a complicated manufacturing process and in increased manufacturing costs.

SUMMARY OF THE INVENTION

Therefore, the object of the present invention is to provide a spoke fastener for use in a bicycle wheel so as to overcome the aforesaid drawbacks of the prior art.

Accordingly, a spoke fastener of this invention is adapted for mounting an externally threaded end of a spoke to a wheel rim which has a spoke mounting wall formed with a spoke fastening hole that is larger than the cross-section of the externally threaded end of the spoke. The spoke fastener comprises a shank extending along a shank axis and having an anchoring portion and an operating portion.

The anchoring portion is formed with a set of resilient arm segments, each of which extends parallel to the shank axis and has a connecting end connected to the operating portion and a distal end opposite to the connecting end along the shank axis. The arm segments are angularly spaced apart from each other relative to the shank axis. The distal end of each of the resilient arm segments is formed with a radial outward anchor projection. The anchor projections on the resilient arm segments cooperate to form the anchoring portion with an initial cross-section in a relaxed state of the resilient arm segments, the initial cross-section being larger than the spoke fastening hole. The anchor projections on the resilient arm segments are forcible radially and inwardly toward the shank axis in such a manner that the anchor projections cooperate to form the anchoring portion with a restricted cross-section smaller than the spoke fastening hole, thereby permitting extension of the anchoring portion through the spoke fastening hole and retention of the anchoring portion on the spoke mounting wall.

The shank is formed with a through hole that extends along the shank axis through the operating and anchoring portions and that permits extension of the externally threaded end of the spoke into the shank from the operating portion. The through hole has an internally threaded segment so as to enable the shank to threadedly engage the externally threaded end of the spoke.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
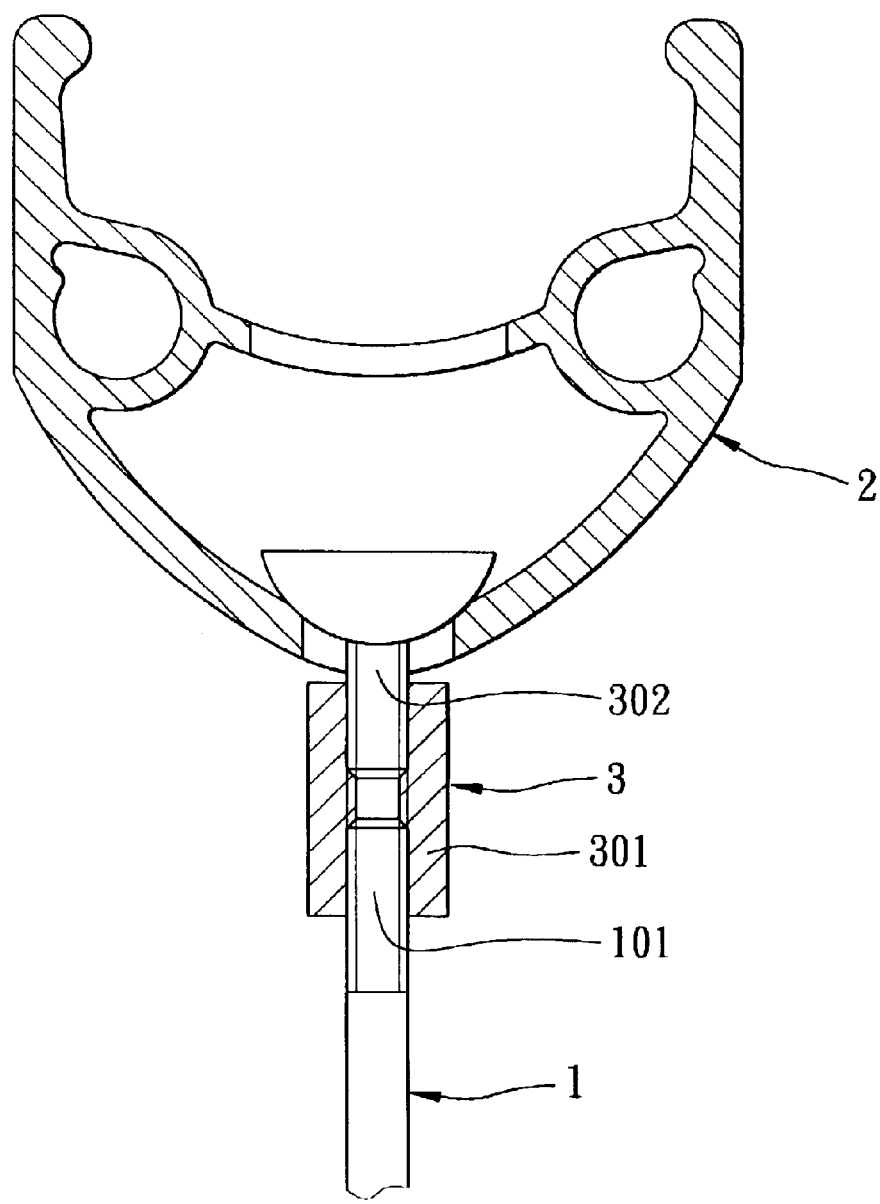
FIG. 1 is an assembled sectional view illustrating how a conventional spoke fastener mounts a spoke to a wheel rim.
Figure 2:
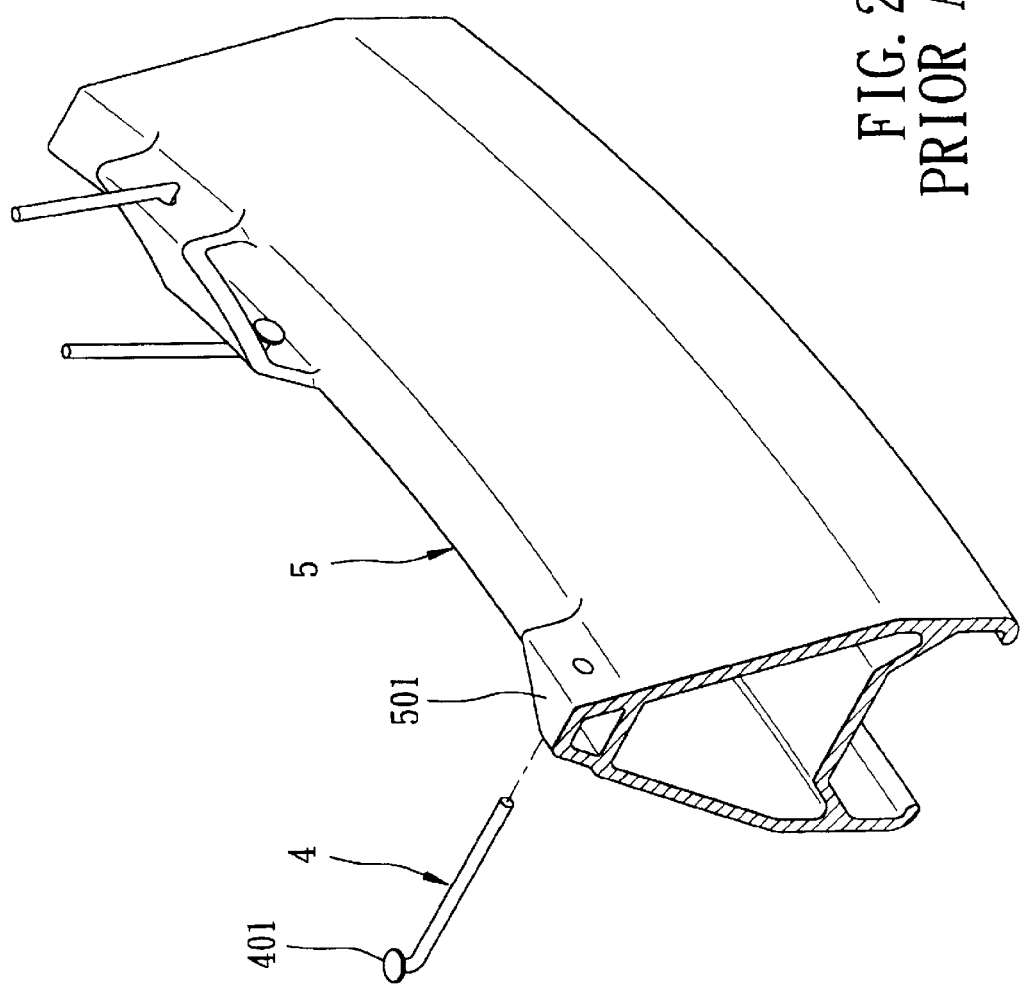
FIG. 2 is a partly exploded perspective view illustrating another conventional connection between a spoke and a wheel rim.
Figure 3:
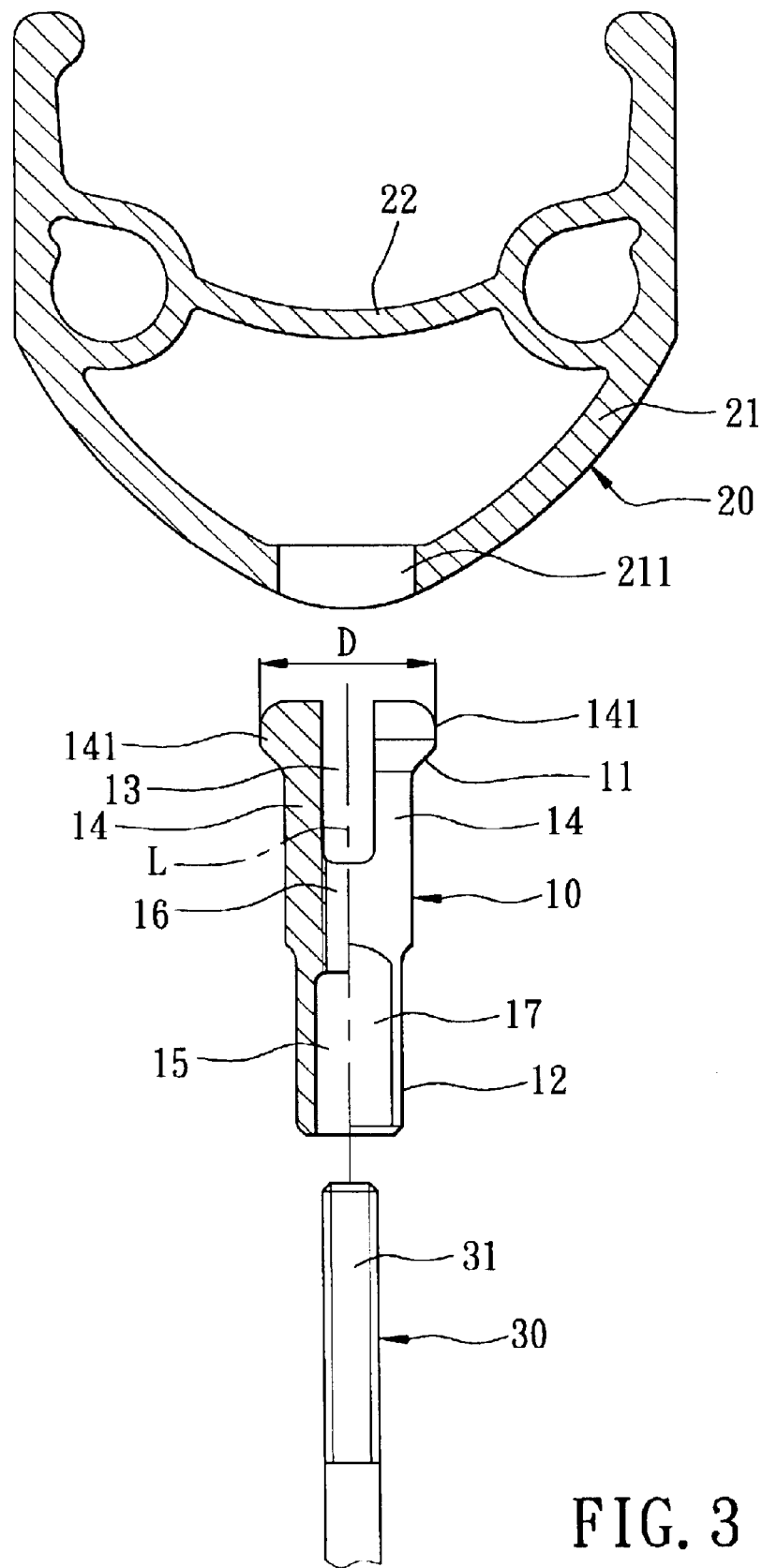
FIG. 3 is a fragmentary exploded sectional view showing the preferred embodiment of a spoke fastener for mounting a spoke to a wheel rim in accordance with the present invention.

Referring to FIG. 3, the preferred embodiment of a spoke fastener according to the present invention is adapted to be used in a bicycle wheel, such as one that does not require an inner tire, for mounting a spoke 30 to a wheel rim 20. The spoke 30 has an externally threaded end 31. The wheel rim 20 has a spoke mounting wall 21 and a bridging wall 22 around the spoke mounting wall 21. The spoke mounting wall 21 is formed with a set of spoke fastening holes 211 (only one is shown) each of which is larger than the cross-section of the externally threaded end 31 of the spoke 30.

The spoke fastener includes a shank 10 extending along a shank axis (L) and having an anchoring portion 11 and an operating portion 12. In this embodiment, the anchoring portion 11 is formed with an axially extending slot 13 that configures the anchoring portion 11 with a pair of resilient arm segments 14 disposed on opposite sides of the slot 13 and angularly spaced apart from each other relative to the shank axis (L). Each of the arm segments 14 extends parallel to the shank axis (L), and has a connecting end connected to the operating portion 12 and a distal end opposite to the connecting end along the shank axis (L). The distal end of each of the arm segments 14 is formed with a radial outward anchor projection 141. The anchor projections 141 on the arm segments 14 cooperate to form the anchoring portion 11 with an initial cross-section (D) in a relaxed state of the arm segments 14, the initial cross-section (D) being larger than the spoke fastening hole 211. The anchor projections 141 on the arm segments 11 are forcible radially and inwardly toward the shank axis (L) in such a manner that the anchor projections 141 cooperate to form the anchoring portion 11 with a restricted cross-section (d) (see FIG. 4) smaller than the spoke fastening hole 211, there by permitting extension of the anchoring portion 11 through the spoke fastening hole 211 and retention of the anchoring portion 11 on the spoke mounting wall 21, as best shown in FIG. 5.

The shank 10 is formed with a through hole 15 that extends along the shank axis (L) through the operating and anchoring portions 12, 11 and that permits extension of the externally threaded end 31 of the spoke 30 into the shank 10 from the operating portion 12. The through hole 15 has an internally threaded segment 16 so as to enable the shank 10 to threadedly engage the externally threaded end 31 of the spoke 30, as best shown in FIG. 5. In the preferred embodiment, the internally threaded segment 16 is disposed in the operating portion 12 and is proximate to the anchoring portion 11. Moreover, the operating portion 12 has a polygonal outer wall surface 17.

Figure 4:
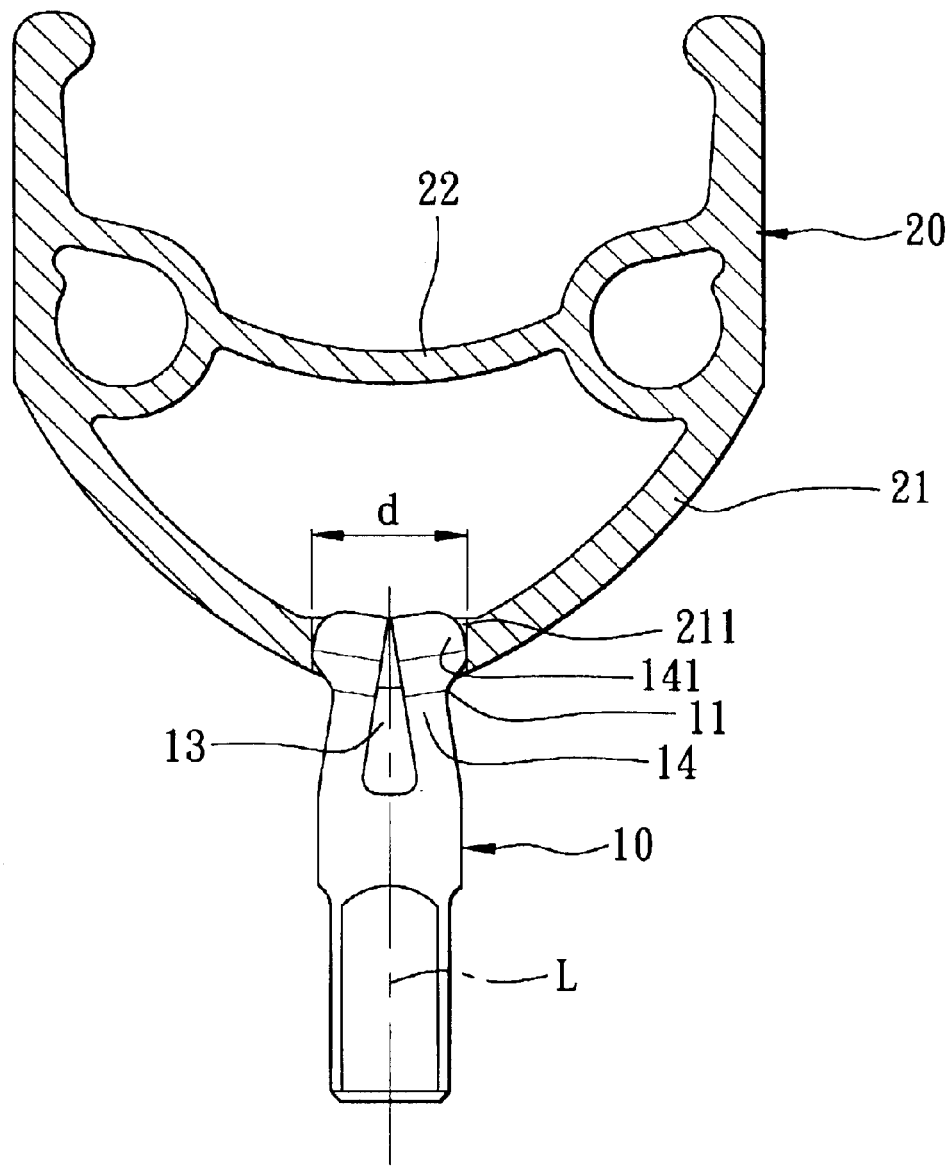
FIG. 4 is a fragmentary sectional view illustrating how the preferred embodiment is assembled on the wheel rim.

As shown in FIG. 4, during assembly, when the anchoring portion 11 is forced into the spoke fastening hole 211, by virtue of the resiliency of the arm segments 14 and the presence of the slot 13, the anchor projections 141 are forced by the hole-defining wall of the spoke fastening hole 211 toward the shank axis (L) such that the anchor projections 141 cooperate to form the anchoring portion 11 with the restricted cross-section (d) that permits extension of the anchoring portion 11 through the spoke fastening hole 211. After the anchor projections 141 move past the hole-defining wall of the spoke fastening hole 211, by virtue of the resiliency of the arm segments 14, the arm segments 14 flex away from the shank axis (L) such that the anchor projections 141 cooperate to form the anchoring portion 11 with the initial cross-section (D), thereby resulting in retention of the anchoring portion 11 on the spoke mounting wall 21.

Figure 5:
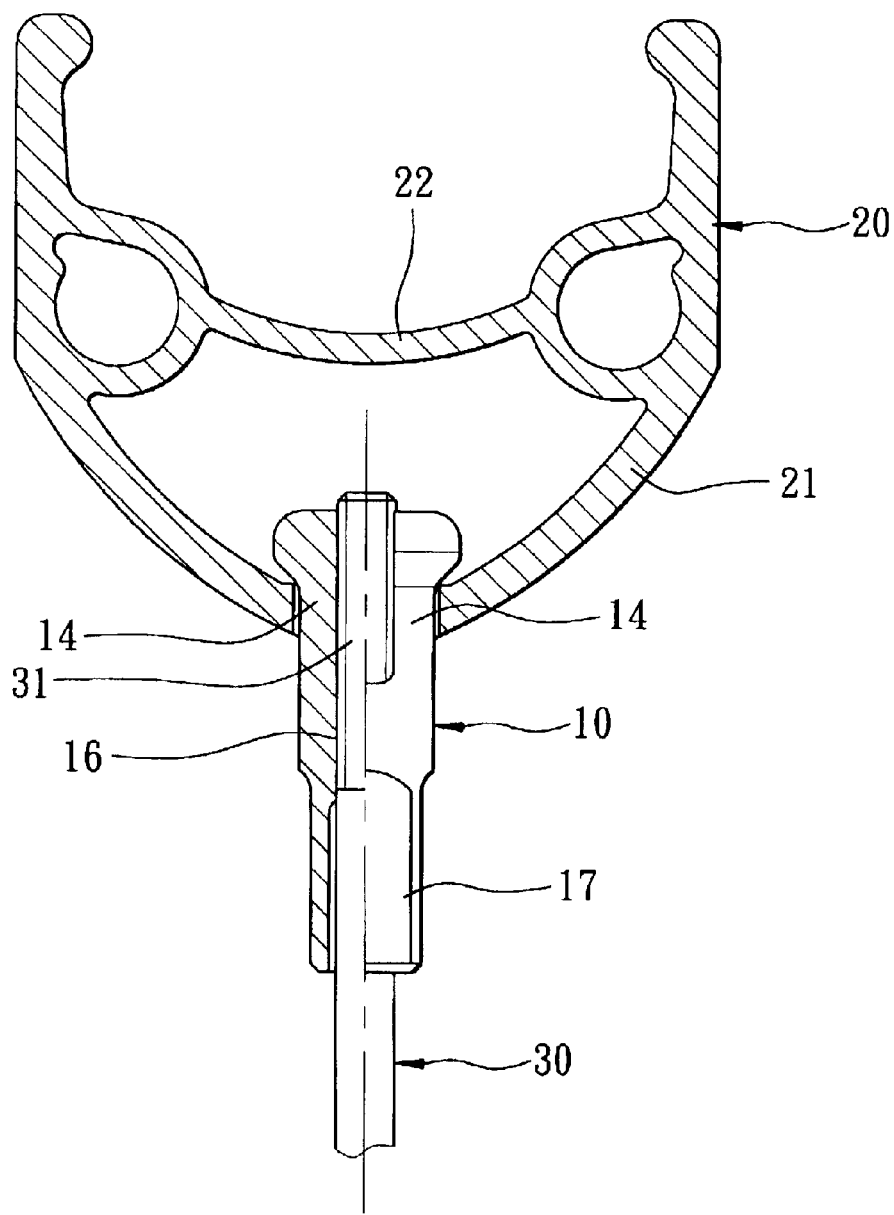
FIG. 5 is a fragmentary sectional view illustrating the preferred embodiment when used to mount the spoke to the wheel rim.

Thereafter, with reference to FIG. 5, the shank 10 is sleeved on the externally threaded end 31 of the spoke 30 by inserting the externally threaded end 31 of the spoke 30 into the through hole 15 in the shank 10 from the operating portion 12. Subsequently, by exerting force on the outer wall surface 17 of the operating portion 12, threaded engagement between the internally threaded segment 16 of the through hole 15 in the shank 10 and the externally threaded end 31 of the spoke 30 can occur. Preferably, the arm segments 14 are configured so that, when the externally threaded end 31 of the spoke 30 extends into the anchoring portion 11 of the shank 10, the arm segments 14 cooperate to grip the externally threaded end 31 of the spoke 30 to enhance connection between the spoke 30 and the wheel rim 20.

It has thus been shown that the spoke fastener of this invention has advantages of a simple structure and ease of manufacture and assembly. Moreover, the wheel rim maintains a conventional design so as not to increase manufacturing costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A spoke fastener for mounting an externally threaded end of a spoke to a wheel rim, the wheel rim having a spoke mounting wall formed with a spoke fastening hole that is larger than the cross-section of the externally threaded end of the spoke, said spoke fastener comprising:

a shank extending along a shank axis and having an anchoring portion and an operating portion, said anchoring portion being formed with a set of resilient arm segments, each of which extends parallel to the shank axis and has a connecting end connected to said operating portion and a distal end opposite to said connecting end along the shank axis, said arm segments being angularly spaced apart from each other relative to the shank axis, said distal end of each of said resilient arm segments being formed with a radial outward anchor projection, said anchor projections on said resilient arm segments cooperating to form said anchoring portion with an initial cross-section in a relaxed state of said resilient arm segments, the initial cross-section being larger than the spoke fastening hole, said anchor projections on said resilient arm segments being forcible radially and inwardly toward the shank axis in such a manner that said anchor projections cooperate to form said anchoring portion with a restricted cross-section smaller than the spoke fastening hole, thereby permitting extension of said anchoring portion through the spoke fastening hole and retention of said anchoring portion on the spoke mounting wall, said shank being formed with a through hole that extends along the shank axis through said operating and anchoring portions and that permits extension of the externally threaded end of the spoke into said shank from said operating portion, the through hole having an internally threaded segment so as to enable said shank to threadedly engage the externally threaded end of the spoke.

2. The spoke fastener as claimed in claim 1, wherein said anchoring portion is formed with an axially extending slot that configures said anchoring portion with a pair of said resilient arm segments disposed on opposite sides of said slot.

3. The spoke fastener as claimed in claim 1, wherein said internally threaded segment is disposed in said operating portion and is proximate to said anchoring portion.

4. The spoke fastener as claimed in claim 1, wherein said operating portion has a polygonal outer wall surface.

* * * * *